United States Patent
Meng et al.

(10) Patent No.: US 7,908,392 B2
(45) Date of Patent: Mar. 15, 2011

(54) WIRELESS TRANSPORTATION PROTOCOL

(75) Inventors: Bin Meng, Singapore (SG); Sie Yong Law, Singapore (SG); Khai Leong Yong, Singapore (SG); Tiong King Ng, Singapore (SG); See Kok Koh, Singapore (SG); Cheng Ann Tan, View (MY)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 12/063,461

(22) PCT Filed: Aug. 10, 2005

(86) PCT No.: PCT/SG2005/000272
§ 371 (c)(1),
(2), (4) Date: Apr. 23, 2009

(87) PCT Pub. No.: WO2007/018474
PCT Pub. Date: Feb. 15, 2007

(65) Prior Publication Data
US 2009/0216898 A1    Aug. 27, 2009

(51) Int. Cl.
*G06F 15/16* (2006.01)
(52) U.S. Cl. .......... 709/232; 709/234; 709/235; 709/250
(58) Field of Classification Search .......... None
See application file for complete search history.

(56) References Cited

U.S. PATENT DOCUMENTS

| | | | |
|---|---|---|---|
| 6,587,985 B1 * | 7/2003 | Fukushima et al. | 714/748 |
| 6,738,821 B1 | 5/2004 | Wilson et al. | |
| 7,607,062 B2 * | 10/2009 | Grove et al. | 714/748 |
| 7,627,693 B2 * | 12/2009 | Pandya | 709/250 |
| 2003/0115380 A1 * | 6/2003 | Ajanovic et al. | 710/1 |
| 2003/0154281 A1 | 8/2003 | Mitsuoka et al. | |
| 2005/0201471 A1 * | 9/2005 | Hannuksela et al. | 375/240.25 |

FOREIGN PATENT DOCUMENTS
WO    WO-03/015332 A2    2/2003

OTHER PUBLICATIONS

Wang et al., An Ethernet Based Data Storage Protocol for Home Network, Consumer Electronics, IEEE Transactions on vol. 50, Issue 2, May 2004, pp. 543-551.

* cited by examiner

*Primary Examiner* — John B. Walsh
(74) *Attorney, Agent, or Firm* — Blank Rome LLP

(57) ABSTRACT

A data transportation protocol (13, 21) for transferring data within a wireless network (6), the protocol (13, 21) comprising: a block I/O interface layer (40) to provide a single level of translation between block I/O storage protocol commands and network packets; and a wireless transport layer (41) to transport the network packets between a client (6A) and server (6B) within the network (6); wherein the block I/O interface layer (40) performs operations directly on a storage device driver (23) and a network device driver (14, 20) of the client (6A) and server (6B).

14 Claims, 5 Drawing Sheets

Figure 5

WSTP PDU

| | |
|---|---|
| Destination MAC | (6 bytes) |
| Source MAC | (6 bytes) |
| PDU type | (2 bytes) |
| Compressed Transportation Header (3 bytes) | |
| | |
| Storage command header (optional) | |
| Wireless control info (optional) | |
| PDU data(optional) | |

Storage command header

| | |
|---|---|
| Working mode | (1 bit) |
| Operation code | (7 bits) |
| Command header length | (1 byte) |
| PDU data length | (1 byte) |
| Serial number | (4 bytes) |
| | |
| Device ID | (optional 4 bytes) |
| Request length | (optional 4 bytes) |
| ACK number | (optional 4 bytes) |
| Sliding window | (optional 4 bytes) |
| Loss control number | (optional 4 bytes) |

(A)                    (B)

WIRELESS TRANSPORTATION PROTOCOL

BACKGROUND OF THE INVENTION

1. Field of the Invention

The invention concerns a data transportation protocol for a wireless network.

2. Description of Related Art

Mobile devices with large storage capacity such as mobile computing devices, image capturing devices, and portable media player devices are becoming more prevalent. It is expected that wireless components such as IEEE 802.11a/b/g or Ultra Wideband (UWB) will be integrated with these mobile devices to provide high bandwidth data access and data sharing abilities. However, existing storage transportation protocols such as IP-based storage protocols (iSCSI, FCIP, iFCP) are not well suited for transporting storage commands and data over a wireless network. These protocols tend to be heavy protocols and are not optimized to appropriately deal with the high packet errors and high packet loss environment of a wireless network. In a wireless network, severe performance degradation of these protocols is encountered.

Typically, a mobile storage device provides a data sharing service that is file based or block based. File based data sharing services include NFS, FTP, CIFS. File based data sharing services suffer from excessive file operation and TCP/IP overhead on the server side.

Block based data sharing services include Internet Small Computer Systems Interface (iSCSI). Block based data sharing services alleviate the burden on the server by moving the file operation to be performed by the client. However, iSCSI is ill suited for wireless networks as it suffers performance degradation due to high bit error and packet loss rates. As most wireless networks are single hop, using the TCP/IP protocol stack is inefficient as there is significant overhead. One solution has been to offload TCP/IP processing to a TCP/IP offload engine (TOE) on a chip or Host Bus Adapter (HBA) In addition to TCP/IP offloading, the encoding and decoding of iSCSI protocol data units (PDUs) can be offloaded to a dedicated iSCSI offload engine to further enhance the performance of the host system. This adds to the total cost of ownership and requires purchase of specialized hardware devices.

Accordingly, there is a desire for an improved transportation protocol for wireless applications. In particular, there is a desire for a transportation protocol highly suitable for short range wireless applications.

BRIEF SUMMARY OF THE INVENTION

In a first preferred aspect, there is provided a method for transferring data within a wireless network, the method comprising: translating between block I/O storage protocol commands and network packets, in a single level; and transporting the network packets between a client and server within the network; wherein operations are performed directly on a storage device driver and a network device driver of the client and server.

In a second aspect, there is provided a data transportation protocol for transferring data within a wireless network, the protocol comprising: a block I/O interface layer to provide a single level of translation between block I/O storage protocol commands and network packets; and a wireless transport layer to transport the network packets between a client and server within the network; wherein the block I/O interface layer performs operations directly on a storage device driver and a network device driver of the client and server.

The protocol may serve the functions of the network layer or the transport layer in the Open Systems Interconnection Reference (OSI) model.

The protocol may serve the functions of the network layer in the OSI model, and the network device driver transfers data using Media Access Control (MAC) addressing of the data link layer in the OSI model.

The protocol may serve the functions of the transport layer in the OSI model, and the data is transferred according to a corresponding network layer addressing scheme.

The storage protocol commands may include any one of the group consisting of: SATA, ATA and SCSI.

The network packets may be Ethernet frames or corresponding network data link frames.

The network packets may be IP packets or corresponding network layer frames.

The wireless transport layer may comprise a sliding window transfer with packet loss control.

The wireless transport layer may comprise a fast receiver and sender timeout value obtained from underlying network architecture.

A repeated ACK packet may be used to report packet loss.

A new timeout value may be based on a round trip time of other wireless protocols.

The wireless transport layer may comprise fast packet loss detection and selective retransmission to selectively retransmit lost packets.

Packet losses may be detected by a hole detection algorithm in which continuous lost packets in the sliding window are defined as a hole, and various hole patterns detected by the algorithm enable errors to be recovered.

In a third aspect, there is provided a data packet when constructed according to the data transportation protocol as described.

BRIEF DESCRIPTION OF THE DRAWINGS

An example of the invention will now be described with reference to the accompanying drawings, in which:

FIG. 5A depicts a protocol data unit (PDU) constructed by the transportation protocol; and FIG. 5B depicts a storage command header.

DETAILED DESCRIPTION OF THE INVENTION

Figure 1:
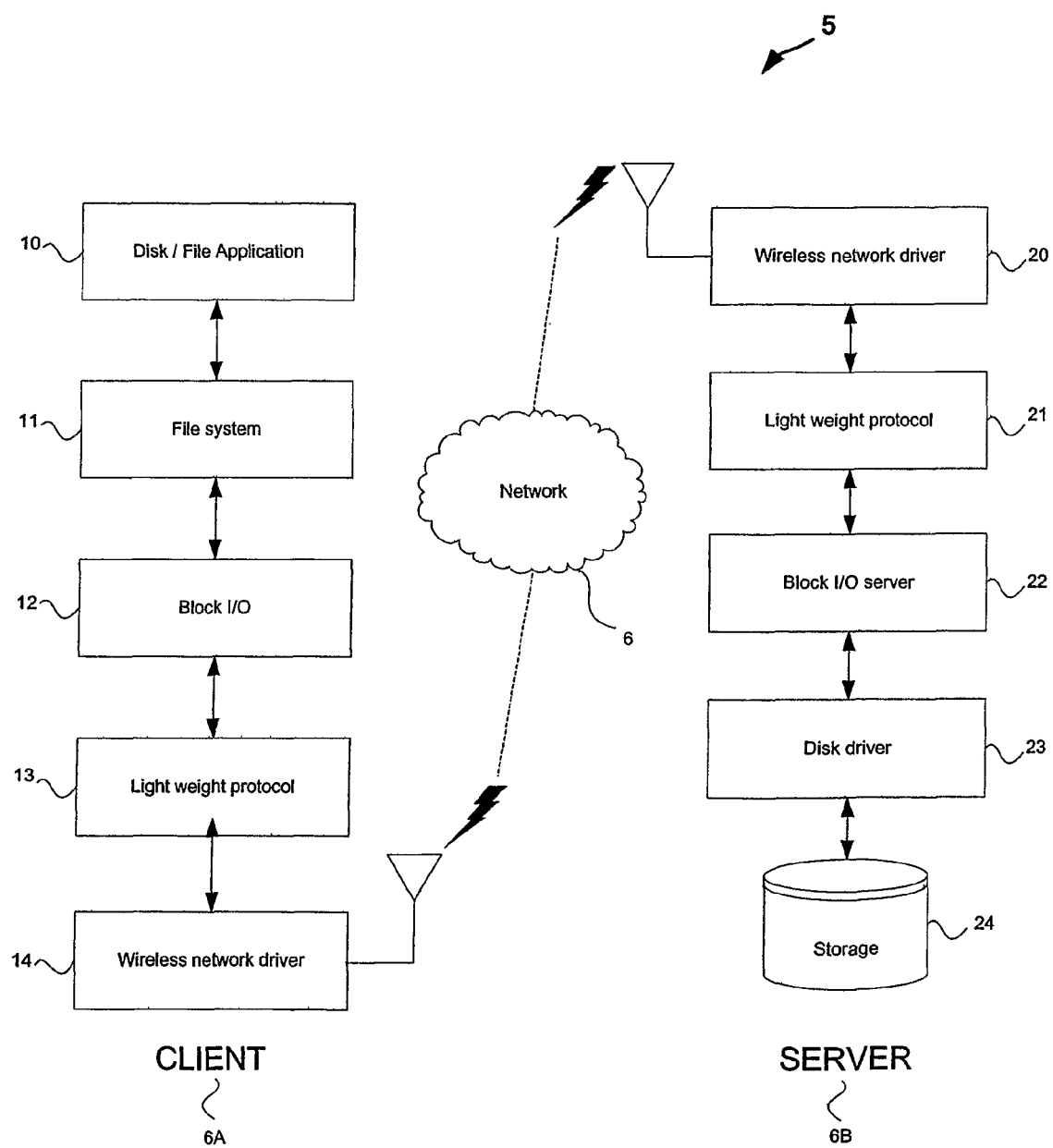
FIG. 1 depicts the protocol layering when a transportation protocol in accordance with a preferred embodiment of the present invention is used as a transport.

The drawings and the following discussion are intended to provide a brief, general description of a suitable computing environment in which the present invention may be implemented. Although not required, the invention will be described in the general context of computer-executable instructions, such as program modules, being executed by a computer such as a personal computer, laptop computer, notebook computer, tablet computer, PDA and the like. Generally, program modules include routines, programs, characters, components, data structures, that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring to the drawings, a wireless storage transportation protocol (WSTP) 13, 21 for a wireless network 6 is provided. These drawings illustrate the deployment of WSTP 13, 21 directly above the data link layer of the Open Systems Interconnection Reference (OSI) model. WSTP may also be deployed as the transport layer directly above the network layer. The protocol is a two layer protocol and comprises: a block I/O interface layer 40 which is the higher layer and a wireless transport layer 41 which is the lower layer. The block I/O interface layer 40 provides a single level of translation between block I/O storage protocol commands and network packets. The block I/O interface layer 40 handles the translation between existing block I/O storage protocols such as SATA, ATA, and SCSI into network packets, and vice-versa. This translation is performed in a single level. The wireless transport layer 41 transports the network packets between a client 6A and server 6B within the network 6. The wireless transport layer 41 handles the network packet transportation between server and client. The protocol has a compact architecture which minimizes the overheads of network packet headers and its complexity. The block I/O interface layer 40 performs operations directly on a storage device driver 23 and a network device driver 14, 20 of the client 6A and server 6B. Preferably, WSTP is used for short range wireless local area networks (LANs) or personal area networks (PANs).

Figure 2:
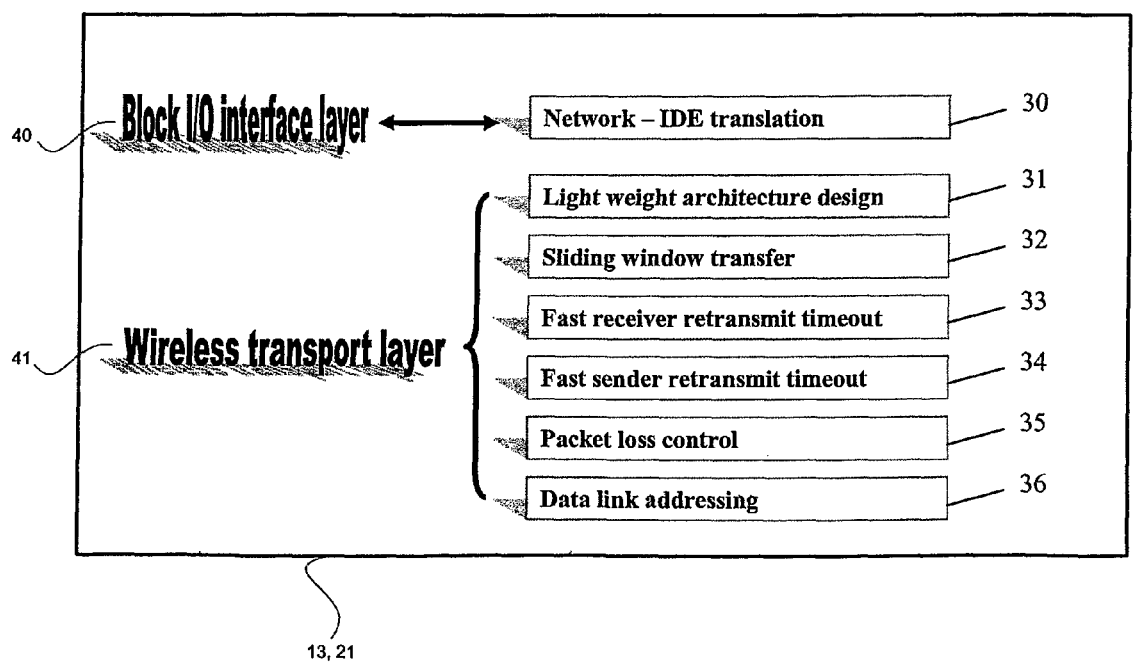
FIG. 2 is a pictorial diagram of features of the transportation protocol.

Turning to FIGS. 1 and 2, from an application 10 on the client side 6A, mass storage I/Os are performed through a variety of system calls. When these I/Os reach the storage protocol layer 12, device specific storage command headers are constructed to perform the requested operation. The storage protocol layer 12 may be SCSI, SATA, or ATA. A host memory buffer descriptor for transmission or receipt of data (if necessary) is constructed. This information is then passed to the WSTP protocol layer 13 where the block I/O interface layer 40 of WSTP 13 constructs a Protocol Data Unit (PDU) containing the storage command header and PDU data (if data is to be transmitted/written). The block I/O interface layer 40 provides block I/O to Ethernet PDU translation, where Ethernet is based on Media Access Control (MAC) addressing. Typically, block I/O means that the application 10 or file system 11 is sending blocks to the storage device 24 to be written or asking for blocks using a logical block address (LBA). FIG. 5A depicts a PDU. The PDU is then passed to the wireless transport layer 41 of WSTP 13, where packetization for segments and datagrams is performed. Next, the datagram is passed to the wireless network driver 14, where Ethernet frame packetization is performed. Finally, the Ethernet frames are placed on the network 6. FIG. 5B depicts a storage command header of the PDU.

When wireless network driver 20 at the server side 6B receives the Ethernet frames, it removes the frame encapsulation and passes the results up to the wireless transport layer 41 of WSTP 21. The wireless transport layer 41 removes the datagram and segment encapsulation, leaving a PDU to be passed to the block I/O interface layer 40 of WSTP 21. The block I/O interface layer 40 removes the storage command header and data (if present) from the PDU and passes them to the storage protocol layer 22 for interpretation. Finally, the requested mass storage operation is performed by the disk driver 23 on the storage device 24.

At any stack layer below the application layer 10 on the client 6A, the protocol 13 may be implemented in hardware. Hardware is meant to include tangible components as well as the firmware that runs on those components. Similarly, at any stack layer below the actual logical units 20 on the server 6B, the protocol implementation may be in hardware. Layers below the first hardware implementation in either stack must also exist in hardware.

Figure 3:
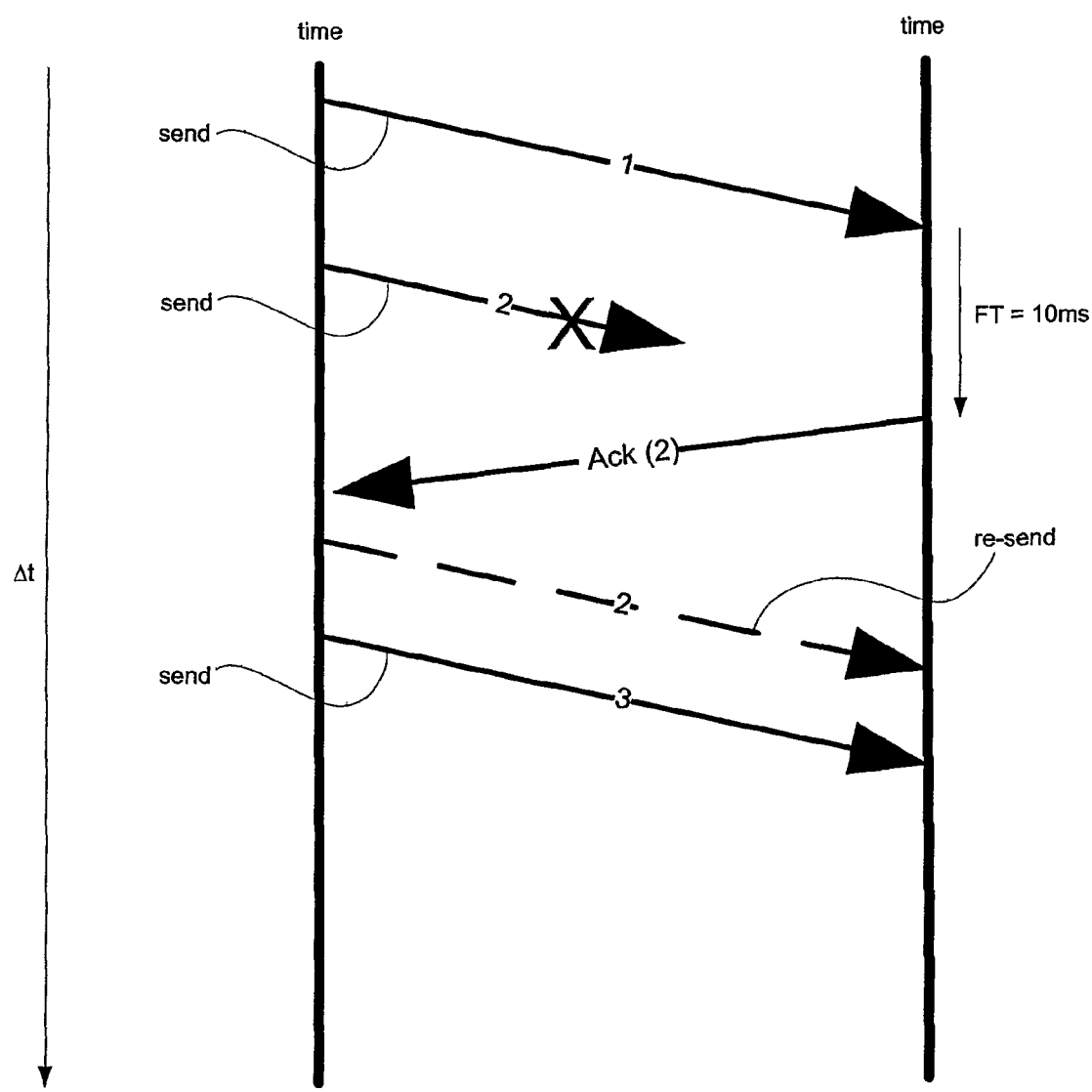
FIG. 3 is a pictorial diagram of a re-transmit event for the transportation protocol.

Referring to FIG. 3, WSTP 13 has sliding window transfer with packet loss control. Any packet dropping signal is considered a packet loss. No congestion exists in the peer-to-peer connection. Also, the sliding window does not shrink when there is packet loss. WSTP 13 has a fast receiver and sender timeout value taken from the underlying wireless network architecture such as IEEE 802.11 or Ultra Wideband (UWB). The new timeout value is computed based on round trip time of various other wireless protocols.

WSTP 13 also has fast packet loss detection and selective retransmission. The ACK of WSTP 13 produces more retransmission information than other transport protocols. WSTP 13 selectively retransmits lost packets in contrast to other transport protocols which retransmit the entire packet queue. Thus, recovery from lost or bad packets is fast under WSTP 13. In the example of FIG. 3, the ACK (2) is transmitted within 10 ms of receipt of the first packet (1) when the second packet (2) is considered lost. When the ACK (2) is received, the second packet (2) is retransmitted. The third packet (3) is transmitted immediately after re-transmission of the second packet (2).

To save the battery life and improve the performance, WSTP 13 directly uses data link layer to transfer data using a Media Access Control (MAC) addressing method. WSTP 13 has a compact protocol layer architecture which enables less CPU utilization and longer battery life.

Figure 4:
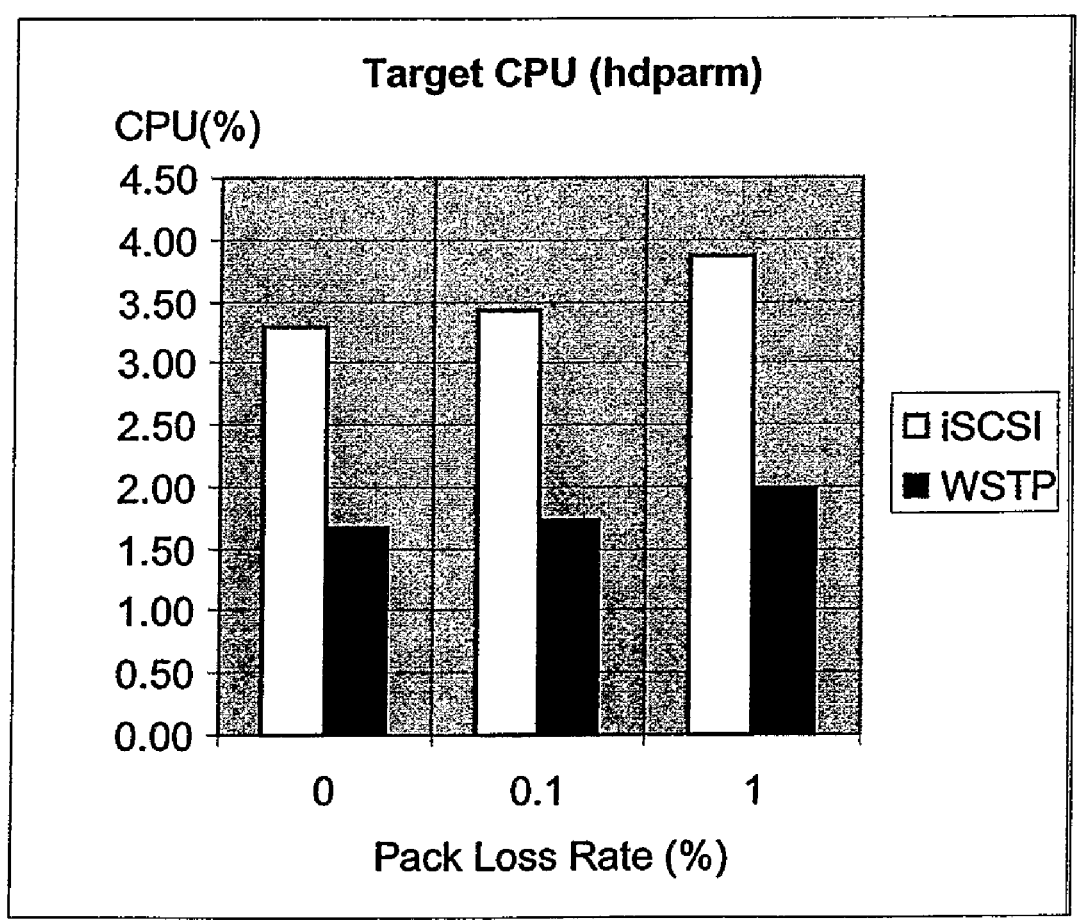
FIG. 4 is a histogram comparing CPU utilisation of iSCSI against the transportation protocol.

WSTP 13 uses block level access to move the computational load of file level operations to the client 6A. WSTP 13 directly employs data link layer as a transmission connection to avoid transmission overhead commonly seen with other transportation protocols such as TCP/IP. In experiments, a wireless storage server using WSTP 13 has better performance and has less power consumption. Referring to FIG. 4, when working at same maximum throughput, a mobile device using WSTP 13 consumes half of the CPU power as that of other protocols such as iSCSI.

Although WSTP 13 has been described with reference to short range peer-to-peer wireless mobile storage applications, it is envisaged that it may also be applicable to long range wired or wireless networks. WSTP 13 also can be used as generic transportation protocol for all other possible data transportation beyond storage data and commands. WSTP 13 performs the transport layer function of the OSI model. In such a scenario, the block I/O interface layer 40 provides block I/O to the network layer PDU translation and WSTP 13 directly uses the network layer addressing scheme to communicate data between devices in the network 6.

WSTP 13 is designed to be lightweight and incorporates mechanisms to react effectively in lossy wireless network in order to maximize the bandwidth available. Packet losses in a wireless network is addressed by a hole detection algorithm where continuous lost packets in a sliding window are defined as a hole. By detecting different hole patterns, errors may be quickly recovered. WSTP 13 may be implemented on mobile devices to provide low power consumption and data sharing services.

Although WSTP 13 is designed for a peer to peer wireless network, it can be extended to any wired, wireless or hybrid wired/wireless network and also for situations where an efficient and lightweight storage transportation protocol for mobile devices is required and in low bandwidth networks.

Since WSTP 13 is a transportation protocol, it can also be extended beyond storage data or commands, to support all other possible types of data transportation. WSTP 13 may be used alone or together with User Datagram Protocol (UDP). It achieves good performance in an error-prone network.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

We claim:

1. A method for transferring data within a wired or wireless network in a peer-to-peer connection, the method comprising:
    providing a client and a server connected in a network for communicating information;
    translating between block I/O storage protocol commands and network packets, in a single level; and
    transporting the network packets between the client and the server within the network within a wireless transport layer that comprises a sliding window transfer packet loss control,
    wherein operations are performed directly on a storage device driver and a network device driver of the client and the server.

2. A data transportation protocol for transferring data within a wired or wireless network in a peer-to-peer connection having a client and a server connected in a network for communicating information, the protocol comprising:
    a block I/O interface layer to provide a single level of translation between block I/O storage protocol commands and network packets; and
    a wireless transport layer to transport the network packets between the client and the server within the network, the wireless transport layer comprising a sliding window transfer with packet loss control,
    wherein the block I/O interface layer performs operations directly on a storage device driver and a network device driver of the client and the server.

3. The protocol according to claim 2, wherein the protocol serves the functions of the network layer or the transport layer in the Open Systems Interconnection Reference (OSI) model.

4. The protocol according to claim 3, wherein the protocol serves the functions of the network layer in the OSI model, and the network device driver transfers data using Media Access Control (MAC) addressing of the data link layer in the OSI model.

5. The protocol according to claim 3, wherein the protocol serves the functions of the transport layer in the OSI model, and the data is transferred according to a corresponding network layer addressing scheme.

6. The protocol according to claim 2, wherein the storage protocol commands include any one of the group consisting of: SATA, ATA and SCSI.

7. The protocol according to claim 4, wherein the network packets are Ethernet frames or corresponding network data link frames.

8. The protocol according to claim 5, wherein the network packets are IP packets or corresponding network layer frames.

9. The protocol according to claim 2, further comprising a hole detection algorithm for detecting continuous lost packets in the sliding window, wherein various hole patterns are detected by the algorithm to enable errors to be recovered.

10. The protocol according to claim 2, wherein the wireless transport layer comprises a receiver and sender timeout value obtained from an underlying network architecture.

11. The protocol according to claim 2, wherein a repeated ACK packet is used to report packet loss.

12. The protocol according to claim 11, wherein a new timeout value is based on a round trip time of other wireless protocols.

13. The protocol according to claim 2, wherein the wireless transport layer comprises fast packet loss detection and selective retransmission to selectively retransmit lost packets.

14. A data packet for use in a wired or wireless network over a peer-to-peer connection having a client and a server connected in a network for communicating information, the data packet, comprising:
    a data packet, wherein the data packet is constructed according to a data transportation protocol comprising:
        a block I/O interface layer to provide a single level of translation block I/O storage protocol commands and network packets; and
        a wireless transport layer to transport the network packets between the client and the server within the network, the wireless transport layer comprising a sliding window transfer with packet loss control;
    wherein the block I/O interface layer performs operations directly on a storage device driver and a network device driver of the client and the server when constructed according to the data transportation protocol according to claim 2.

* * * * *